June 15, 1937. S. KOHN 2,083,717
FRANKFURTER COOKER
Original Filed Aug. 13, 1934 2 Sheets-Sheet 2
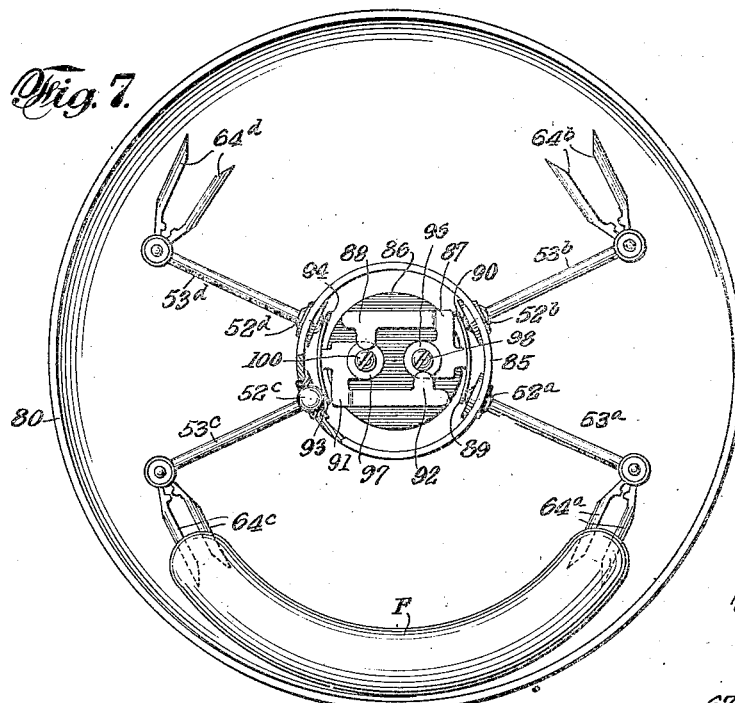
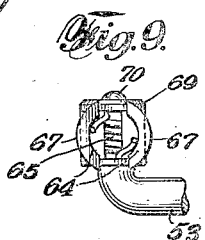
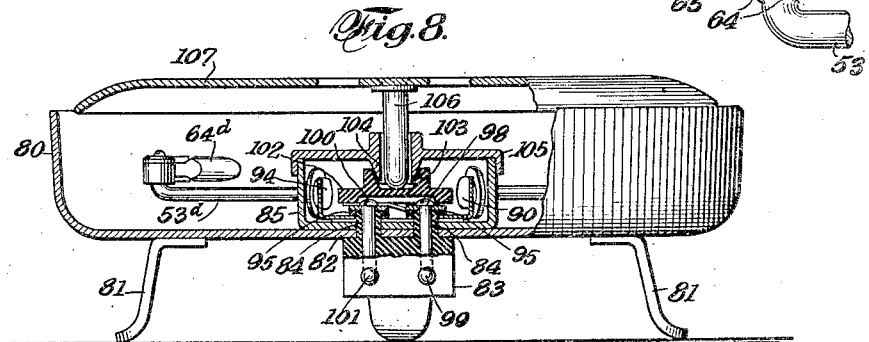
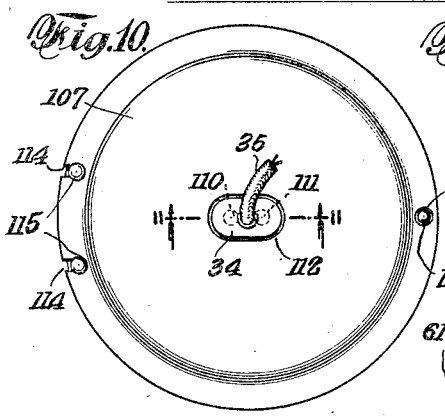
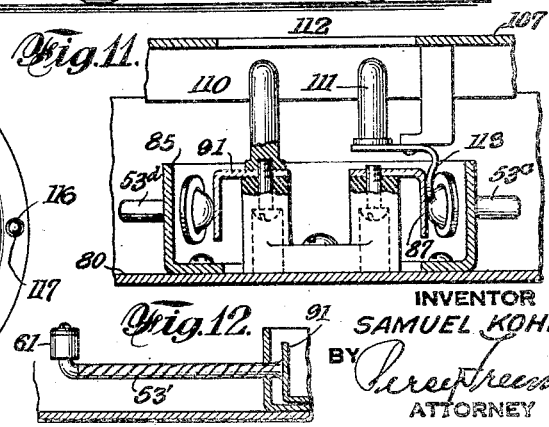
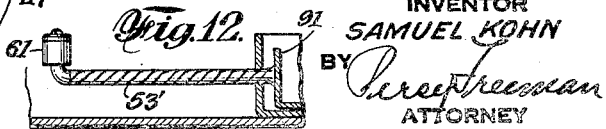
INVENTOR
SAMUEL KOHN
BY
ATTORNEY Patented June 15, 1937

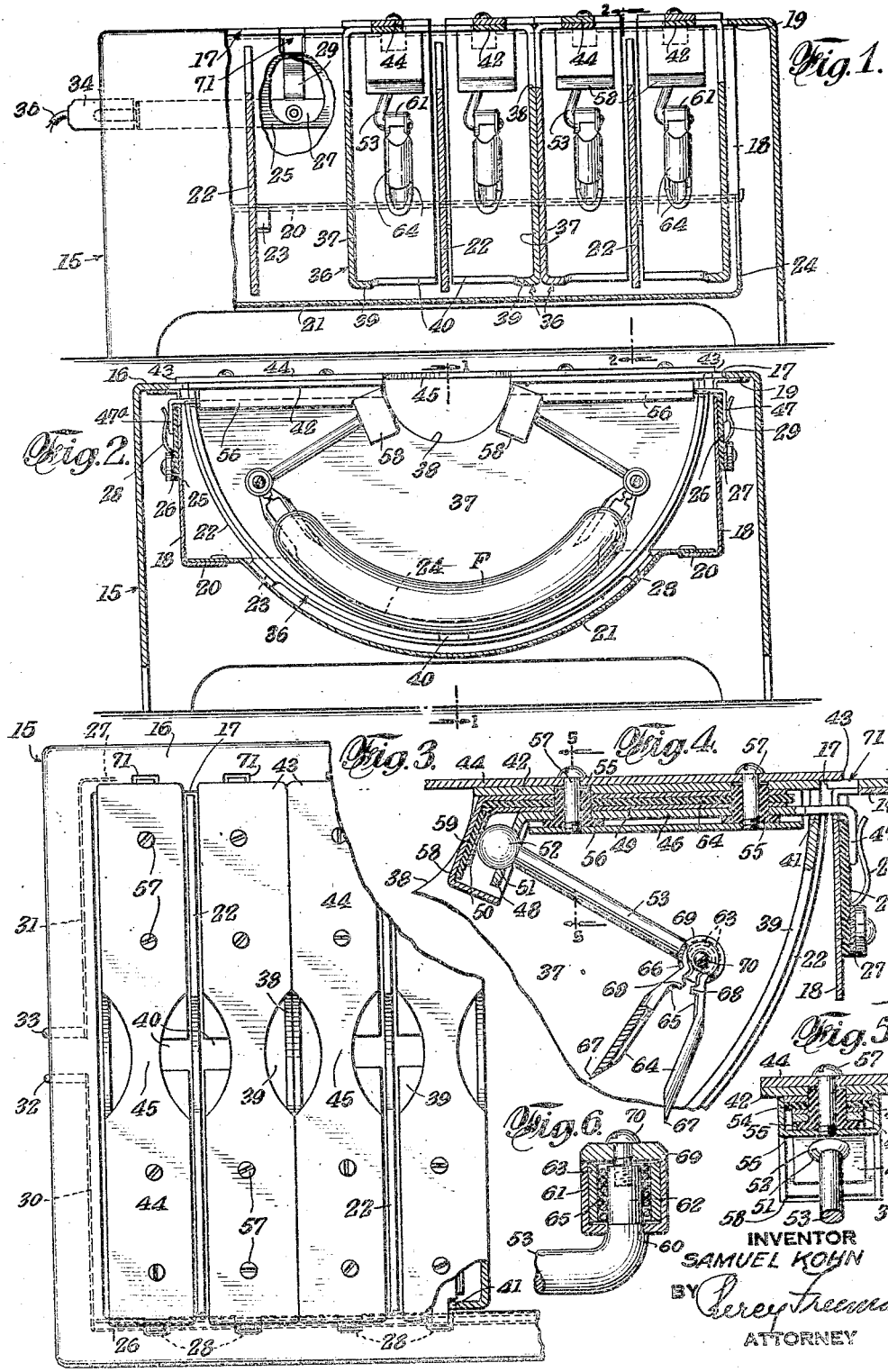

2,083,717

UNITED STATES PATENT OFFICE 2,083,717

FRANKFURTER COOKER

Samuel Kohn, Jackson Heights, N. Y.

Refiled for abandoned application Serial No. 739,523, August 13, 1934. This application December 7, 1936, Serial No. 114,660

8 Claims. (Cl. 219—19)

This invention relates to improvements in electrical cookers for Frankfurters or the like and particularly to that type of cooker wherein an electric current is passed through the Frankfurter.

Cookers of this type are now generally known but have not attained a universal use despite the fact that a Frankfurter cooked in this manner is full flavored, delicious and otherwise greatly desired as an article of food.

The one problem which, heretofore, has not been solved, is to maintain proper contact between the Frankfurter and its electrodes. When it is borne in mind that a Frankfurter or the like comprises a thin skin casing filled with ground meats, fats and moisture and that considerable pressure is generated within the casing when the fats and moisture are heated, it will be realized that the tendency of the Frankfurter to burst or the skin casing to fracture at its weakest point is quite great. In cookers of this type wherein the electrodes pierce the casing at the ends of the Frankfurter, the tendency was for the weakened ends of the Frankfurter to open or spread apart and the much to be desired intimate contact of the electrodes with the Frankfurter filling was destroyed. This interrupted the cooking until contact was again established.

This invention, therefore, seeks to provide an electrical cooker of this type in which the above faults are eliminated; which is safe and easy to operate; which is economical in use; and which can be easily cleaned.

An important object of the invention resides in providing an electrical cooker for Frankfurters or the like which is provided with electrodes upon which the ends of the Frankfurters may be impaled in a manner whereby good contact is always maintained between them and the Frankfurter.

Another object is to provide, in a cooker of this type, tined electrodes which are resiliently mounted so they may follow the spreading portions of the Frankfurter ends to retain good electrical contact therewith.

A further object of the invention resides in the provision of means carrying the electrodes, which are easily positioned for varying lengths and thicknesses of Frankfurters.

A further object is to provide means to conduct electrical current to the Frankfurter wherein the current is immediately interrupted when the Frankfurter is removed from the cooker and reestablished immediately upon the placing of a Frankfurter in the cooker.

Other objects are to provide means whereby inadvertent bridging of the electric terminals of the cooker is obviated; to provide a cooker especially adapted for use in the home; and to provide a cooker of large capacity for use in restaurants, Frankfurter stands and the like.

The foregoing and other objects, features and advantages will become further apparent from the following detailed description of the accompanying drawings which illustrate, by way of example, preferred forms of the invention, and in which:—

Fig. 1 is a partial longitudinal sectional view of a cooker adapted for use in restaurants, Frankfurter stands and the like, the sectioned portion being taken along the line 1—1 of Fig. 2.

Fig. 2 is a cross-sectional view of the cooker shown in Fig. 1 as taken along the line 2—2.

Fig. 3 is a partial plan view thereof.

Fig. 4 is an enlarged fragmentary vertical sectional detail of one of the electrodes, its mounting and its electrical connection to the cooker frame.

Fig. 5 is a detail sectional view as taken along the line 5—5 of Fig. 4.

Fig. 6 is a further enlarged detail vertical sectional view of the electrode mounting.

Fig. 7 is a top plan view of a preferred form of cooker adapted for home use, the cover and certain other portions being omitted.

Fig. 8 is a partial elevational and partial vertical sectional view thereof.

Fig. 9 is an elevational detail of one of the electrodes shown in Figs. 4 and 7.

Fig. 10 is a plan view of an alternate form of cooker also adapted for home use.

Fig. 11 is a fragmentary, enlarged, vertical sectional detail view as taken on the line 11—11 of Fig. 10.

Fig. 12 is a sectional detail of a modified form of electrode support arm.

Referring to the drawings in greater detail and particularly to Figs. 1, 2, 3, 4, 5, 6, and 9 the cooker comprises a frame or base 15 which in plan may be square, rectangular, circular, oval or otherwise suitably shaped and provided with a top 16 having the opening 17. This frame may be made of metal or non-metallic material as desired.

Two opposed walls are preferably provided at 18 fixed to or integral with the frame at 19 and provided with inreaching portions 20 adapted to support between them a grease pan 21 to which is preferably attached a plurality of partitions 22 as at 23. The grease pan is preferably curved as shown and provided with end walls 24.

Each of the walls 18 has affixed an insulating plate 25 on its side nearest the frame walls and thereto is attached at one side a buss bar 26 and at the other a buss bar 27. These buss bars are each respectively provided with a plurality of upstanding spring contacts 28 and 29.

The buss bar 26 is provided with a right angled extension 30 and the bus bar 27 with a similar extension 31 which respectively terminate in prongs 32 and 33 adapted to be engaged by a plug 34 at the end of an electric cable 35. In this manner electric current may be conducted from the cable 35 to the prong 32, extension 30, buss bar 26, and so to the spring contacts 28, and similarly to the prong 33, extension 31, buss bar 27 and so to the spring contacts 29.

The partitions 22 are so spaced as to provide between them an area adapted to receive from above one or more trays 36. Since all these trays are similar only one will be described.

The tray is preferably semi-circular in shape with a vertical wall 37 having a curved cut-out 38 at its straight side and provided with a curved wall 39 notched at 40 at its center and at 41 at its ends. The upper straight side of the tray is provided with a flat wall 42 interrupted at the cut-out 38. The tray thus described is adapted to be inserted from above into an area between and adjacent one of the partitions 22 and to remain suspended in this position, being supported by the ends 43 of the plate 44 resting on the top 16 of the frame. To facilitate the removal of the tray from the frame the plate 44 is reduced at 45 to provide a hand grip.

To the underface of the wall 42 and at each side thereof there is provided means to contact the end of a Frankfurter and means to conduct electric current from either of the spring contacts 28 and 29 thereto.

With particular reference to Figs. 4, 5, and 6 which illustrate the above means, a connector 46 having a downturned end 47 beyond the end of the tray and adapted to engage the spring contact 29 and an angularly disposed opposite end 48, is provided. Immediately above the connector 46 is disposed a spring member 49 provided with an angularly bent end 50 spaced from the end 48. Between the ends 48 and 50 and disposed in an opening 51 in the end 48, is a ball 52 on the end of the arm 53. The connector 46 and spring 49 are insulated from the tray by means of the plate 54 and the plugs 55 and a cover 56 is placed therearound and the entire assembly is held in place by means of the screws 57 which pass through the insulation plugs 55.

The ends 48 and 50 are also provided with a cover 58 which is electrically insulated from the end 50 by the plate 59.

The above provides a universal mounting for the arm 53 so it may be limitedly swung in any direction.

The other end of the arm 53 is provided with an angled extension shouldered at 60 for non-rotational engagement with a cup 61 and having a reduced rounded portion 62. The curved ends 63 of a pair of tines 64 are disposed within the cup and adapted to abut each other through the agency of a spring 65, the electrodes 64 thereby assuming a somewhat spread position as shown. The cup 61 is provided with a cut-out 66 so the electrodes may be limitedly swung about the portion 62. The tines are preferably curved (Fig. 9) and provided with sharpened ends 67. Adjacent the cup, the tines are each provided with an inreaching lug or lugs 68 for the purpose later set forth.

A plate washer 69 overlies the upper open end of the cup and the assembly is retained by means of the screw 70 engaged in a screw seat in the end of the rounded portion 62.

The top of the frame and the walls 18 are notched at 71 to permit the passage of the ends 47 when the tray is moved into and out of the frame. These notches are so placed as to permit insertion of the trays only with their open sides adjacent the portions 22 whereby in effect providing a substantially complete enclosure for the Frankfurter formed by the tray walls 37, 39, and 42 and the portion 22.

In operation a tray is removed from the frame and the tines of one of the electrodes thereof is thrust into one end of a Frankfurter, the lugs 68 first being contacted so the tines are substantially parallel. The other end of the Frankfurter is similarly pierced by the other tined electrode of the tray.

The arms 53 are adapted to swing towards and away from each other to accommodate various lengths of Frankfurters and are also adapted to limitedly swing in the opposite plane to accommodate various thicknesses thereof, the slot 66 in the cup 61 permitting each electrode to assume an inline position in relation to the Frankfurter length. The middle of the Frankfurter may or may not, as the case might be, contact the lowermost portion of the curved wall of the tray.

The tray is now placed into the frame so the end 47 contacts the spring 29 and the opposite end 47a contacts the spring 28 and electric current may then flow from the spring 29 to the end 47, connector 46, end 48, ball 52, arm 53 and so to the electrode 64 into the Frankfurter F, and thence out to the spring contact 28 or vice versa.

During the cooking process the ends of the Frankfurter may open out or curl away but the electrodes under the urgency of the springs 65 will gradually move apart to maintain good electrical contact with the Frankfurter until cooking is completed.

Possible drippings will be collected in the drip pan 21 and the cooking may be inspected through the openings provided by the cut-outs 38 and 45.

The cooker and trays are easily cleaned since each tray may be cleaned separately and the drip pan and partitions may be removed for separate cleaning.

In the form of the invention shown in Figs. 7 and 8 a simple device for the purpose and adapted for home use, is shown.

A circular dish 80 is provided with supporting legs 81 and to the bottom 82 of the dish is attached an insulating block 83 having a pair of upstanding posts 84 protruding through the bottom of the dish.

An open-topped cup 85 rests on the dish bottom and the posts 84 also pass therethrough and through an insulating plate 86. One post carries a conductor 87 having a spring arm 88 and contactors 89 and 90 and the other post carries a similar conductor 91, having a spring arm 92 and contactors 93 and 94.

An insulating washer 95 sets on each conductor 87, 91 and above each washer is respectively placed a metal washer or the like 96 and 97.

A screw 98 passes through one post to electrically connect the washer 96 to a prong 99 and a similar screw 100 passes through the other post to electrically connect the washer 97 to the prong 101.

The contactors respectively engage against the inner portions of insulated balls 52a, 52b, 52c, and 52d on the arms 53a, 53b, 53c, and 53d.

Electrodes such as previously described are carried on the other ends of the respective arms at 64a, 64b, 64c, and 64d.

An insulating member 102 is adapted to overlie the spring arms 88 and 92 and is provided with a conical socket 103 receptive of the downreaching conical boss 104 on the cover plate 105 of the cup. A central opening is provided in the cover plate 105 and a stud 106 fixed with a dish cover 107 is adapted to pass through said opening to press upon the member 102 and so to cause the spring arm 88 to contact the washer 97 and the spring arm 92 to contact the washer 96.

Now when a Frankfurter is positioned as shown between the electrodes 64a and 64d, the current therethrough will flow as follows:—prong 99, screw 98, washer 96, arm 92, conductor 91, contactor 93, ball 52c, arm 53c, electrodes 64c, Frankfurter F, electrodes 64a, arm 53a, ball 52a, contactor 89, conductor 87, arm 88, washer 97, screw 100 and prongs 101 or vice versa. Similarly, the current would pass through a Frankfurter connected between the electrodes 64b and 64d.

It will be noted that current is supplied to the Frankfurters only when the cover 107 is in place, the weight of which is utilized to close the gaps between 92 and 96, and 88 and 97.

The form of the invention shown in Figs. 10 and 11 provides for a device somewhat similar to the one last described, except in this instance one prong 110 is carried with the dish 80 and the other prong 111 is carried with the cover 107 and the plug 34 is insertable through an opening 112 in the cover to supply current to the prongs 110 and 111. To accomplish this, a spring contact 113 engages the conductor 87 when the cover is placed in position over the dish by first engaging the notches 114 with the headed studs 115 and then dropping the hole 116 over the stud 117. It is apparent, therefore, that no current can be supplied to the cooker until the cover is in place over the dish.

If desired the employment of the balls 52 to provide universal movement of the arms 53 may be dispensed with and instead the arms may be flexible as shown at 53' in Fig. 12 wherein, a stranded wire cable is illustrated although a close wound coil spring may be utilized for the purpose.

From the foregoing it can be seen that simple and practical forms of the invention in its preferred embodiments has been described. It is also apparent that many changes and modifications in the structure, form, size and arrangements of the parts may well be made without departing from the true spirit and general scope of the invention as outlined in the following claims.

Having thus described my invention, what I claim as new and desire to secure by Letters Patent, is:

1. In an electrical cooker for Frankfurters or the like, an electrode comprising a cup, a pair of tines, each having a curved rear end nesting in said cup in opposed relation to the other and relatively movable therein, the other end of each tine being sharpened, and spring means normally urging apart the sharpened ends of the tines so their rear curved ends abut.

2. In an electrical cooker for Frankfurters or the like, an electrode comprising a cup, a pair of tines, each having a curved rear end nesting in said cup, in opposed relation to each other, said tines being movable relative to each other within said cup, the other end of each tine being sharpened, lug means on each tine intermediate its length, and spring means normally urging apart the sharpened ends of the tines so their rear curved ends abut, said lug means abutting when the tines are moved towards each other preparatory to piercing a Frankfurter.

3. In an electrical cooker for Frankfurters or the like, an electrode comprising a pair of relatively movable tines normally disposed at an acute angle with respect to each other and adapted to be moved towards each other until they are substantially parallel preparatory to piercing a Frankfurter, and means urging the tines to their normal position after insertion thereof in the end of a Frankfurter to maintain good electrical contact with the meat of the Frankfurter to prevent arcing.

4. In an electrical cooker for Frankfurters or the like, spaced arms, a universal mounting for each arm, and an electrode at the free end of each arm, each electrode comprising a pair of relatively movable resiliently mounted tines, adapted when moved toward each other to pierce and enter the end of a Frankfurter and adapted when so entered, to tend to spread apart to maintain good electrical contact with the meat of the Frankfurter to prevent arcing.

5. An electrical cooker for Frankfurters or the like comprising a casing having an opening, a plurality of trays adapted to be inserted into said opening, a pair of spaced electrodes carried by each tray, each electrode comprising a pair of relatively movable tines which are normally urged apart, and the electrodes of each pair being adapted when its tines are held closely adjacent each other, to pierce and enter the opposite ends of a Frankfurter, and cooperating means between each tray and the frame to conduct electrical current to the Frankfurter.

6. An electrical cooker for Frankfurters or the like comprising a dish, a cover therefor, opposed pairs of electrodes adapted to pierce and enter the ends of a Frankfurter carried by the dish, a universal mounting within the dish for each electrode, normally open switch means carried by the dish, means to connect the switch to a source of electric current, and means carried by the cover to close the switch means, whereby current is carried to the electrodes.

7. An electrical cooker for Frankfurters or the like comprising a dish, normally open switch means disposed in the center of said dish, opposed pairs of electrodes universally mounted adjacent the switch means and adapted to pierce and enter the ends of a Frankfurter and in electrical circuit with said switch means, a cover for the dish, and means on the cover adapted to close the switch means to conduct current from a current source to the electrodes.

8. In an electrical cooker for Frankfurters or the like, spaced arms, a universal ball and socket mounting for each arm, and an electrode at the free end of each arm, each electrode comprising a pair of relatively movable resiliently mounted tines, adapted when moved toward each other to pierce and enter the end of a Frankfurter, and further adapted when so entered, to tend to spread apart to maintain good electrical contact with the meat of the Frankfurter to prevent arcing.

SAMUEL KOHN.